US008544286B2

(12) United States Patent
Janssen

(10) Patent No.: US 8,544,286 B2
(45) Date of Patent: Oct. 1, 2013

(54) SYSTEM INCLUDING ELECTRONIC BASED TEMPERATURE MONITORING DEVICE AND OPTIONAL INTEGRATED COOLER FOR MAINTAINING A TEMPERATURE OF SUCH AS INJECTABLES

(76) Inventor: Brian D. Janssen, Birmingham, MI (US)

( * ) Notice: Subject to any disclaimer, the term of this patent is extended or adjusted under 35 U.S.C. 154(b) by 2028 days.

(21) Appl. No.: 11/532,007

(22) Filed: Sep. 14, 2006

(65) Prior Publication Data

US 2008/0082043 A1 Apr. 3, 2008

(51) Int. Cl.
*G01K 13/00* (2006.01)
*F25D 3/08* (2006.01)
*F25D 19/00* (2006.01)

(52) U.S. Cl.
USPC .............................. 62/130; 62/448; 62/457.1

(58) Field of Classification Search
USPC ................ 62/157, 129, 231, 448, 457.1, 237; 165/11.1
See application file for complete search history.

(56) References Cited

U.S. PATENT DOCUMENTS

| | | | | |
|---|---|---|---|---|
| 2,556,418 | A * | 6/1951 | Del Mar | 62/62 |
| 2,945,954 | A * | 7/1960 | Gaugler | 250/459.1 |
| 3,545,221 | A * | 12/1970 | Koski et al. | 435/284.1 |
| 4,145,895 | A * | 3/1979 | Hjertstrand et al. | 62/529 |
| 4,169,357 | A * | 10/1979 | Kelley | 62/126 |
| 4,298,163 | A * | 11/1981 | Richardson et al. | 236/46 R |
| 4,316,473 | A * | 2/1982 | Beskin | 600/576 |
| 4,322,954 | A | 4/1982 | Sheehan et al. | |
| 4,429,793 | A | 2/1984 | Ehmann | |
| 4,490,986 | A * | 1/1985 | Paddock | 62/127 |
| 4,688,388 | A * | 8/1987 | Lower et al. | 62/126 |
| 4,768,706 | A * | 9/1988 | Parfitt | 236/94 |
| 4,819,714 | A * | 4/1989 | Otsuka et al. | 165/217 |
| 5,097,829 | A * | 3/1992 | Quisenberry | 607/105 |
| 5,285,657 | A | 2/1994 | Bacchi et al. | |
| 5,390,791 | A | 2/1995 | Yeager | |
| 5,400,610 | A | 3/1995 | Macedo | |
| 5,492,082 | A * | 2/1996 | Krevinghaus et al. | 119/448 |
| 5,865,314 | A | 2/1999 | Jacober | |
| 5,934,099 | A | 8/1999 | Cook et al. | |

(Continued)

*Primary Examiner* — Judy Swann
*Assistant Examiner* — Alexis Cox
(74) *Attorney, Agent, or Firm* — Gifford, Krass, Sprinkle, Anderson & Citkowski, P.C.; Douglas J. McEvoy

(57) ABSTRACT

A monitor either usable in cooperation with or apart from a portable cooler to maintain a temperature of medications. The cooling device defines an interior volume for holding the medications, a power source including at least one of a 12 volt DC and an attachable 110 volt AC supply. A portable monitoring device is integrated with the cooling device and further includes a processor driven circuitry for recording a temperature associated with the interior volume containing the medications. The recorded temperature is compared at determined intervals to a preset programmed temperature range and, upon exceeding the programmed range, the device alerts the user. An alternative monitoring device is envisioned to ship with the medication from the manufacturer and remain with the medication container until the medications are used. If during transport or subsequent storage a temperature range is exceeded or the medication is at a certain temperature for a defined period of time, the chemical, mechanical, or electronic based device provides a good/bad product quality indication for the user. A derivative of this concept would be a gauge based device similar to a stopwatch or small pager. In addition to having a yes/no indicator, the battery based device would provide the required temperature monitoring parameters (e.g., range, current temperature). It would also reside with the medication during shipment and subsequent storage.

9 Claims, 4 Drawing Sheets

(56) References Cited

U.S. PATENT DOCUMENTS

| | | | | |
|---|---|---|---|---|
| 5,956,968 | A | 9/1999 | Grabowski | |
| 6,060,987 | A * | 5/2000 | Marlia | 340/540 |
| 6,223,551 | B1 | 5/2001 | Mitchell et al. | |
| 6,253,570 | B1 | 7/2001 | Lustig | |
| 6,666,032 | B1 * | 12/2003 | Rickson et al. | 62/3.6 |
| 6,722,782 | B2 | 4/2004 | Faries, Jr. et al. | |
| 6,845,918 | B2 * | 1/2005 | Rotondo | 236/46 R |
| 6,866,151 | B2 | 3/2005 | Mousset et al. | |
| 6,935,133 | B2 | 8/2005 | Keeter et al. | |
| 7,041,941 | B2 | 5/2006 | Faries, Jr. et al. | |
| 8,371,135 | B2 * | 2/2013 | Lee | 62/127 |
| 2001/0054291 | A1 * | 12/2001 | Roh et al. | 62/126 |
| 2002/0000092 | A1 * | 1/2002 | Sharood et al. | 62/127 |
| 2002/0157411 | A1 * | 10/2002 | Ishikawa et al. | 62/231 |
| 2003/0000692 | A1 * | 1/2003 | Okano et al. | 165/238 |
| 2003/0209018 | A1 * | 11/2003 | Becke et al. | 62/126 |
| 2004/0177625 | A1 * | 9/2004 | Miller et al. | 62/129 |
| 2004/0189258 | A1 | 9/2004 | Lehmann et al. | |
| 2004/0221600 | A1 * | 11/2004 | Flum | 62/249 |
| 2005/0001730 | A1 * | 1/2005 | Alderman | 340/585 |
| 2005/0005618 | A1 * | 1/2005 | Neumann | 62/126 |
| 2005/0160746 | A1 * | 7/2005 | Kwon | 62/125 |
| 2005/0229611 | A1 * | 10/2005 | Welch | 62/129 |
| 2006/0191282 | A1 * | 8/2006 | Sekiya et al. | 62/371 |
| 2006/0225443 | A1 * | 10/2006 | Tamborra | 62/157 |
| 2007/0193280 | A1 * | 8/2007 | Tuskiewicz et al. | 62/3.6 |
| 2009/0090127 | A1 * | 4/2009 | Do | 62/449 |
| 2009/0139248 | A1 * | 6/2009 | Crumlin et al. | 62/62 |

* cited by examiner

SYSTEM INCLUDING ELECTRONIC BASED TEMPERATURE MONITORING DEVICE AND OPTIONAL INTEGRATED COOLER FOR MAINTAINING A TEMPERATURE OF SUCH AS INJECTABLES

BACKGROUND OF THE INVENTION

1. Field of the Invention

The present invention relates generally to storage and refrigeration of such as temperature-sensitive medicinal supplies. In particular, the present invention teaches a medical system for the monitoring, storage and transport of prescription medications requiring continuous refrigeration storage.

2. Description of the Prior Art

Medical storage devices are known in the art, the purpose for these being the ability to maintain, in a substantially continuous climate-controlled fashion, medicines such as subcutaneous injectables. A first example of such a known monitoring device is set forth in U.S. Patent Application Publication No. 2004/0189258 and which teaches a service life monitoring system, a counting device for counting at least one of the charging and injection procedures performed, a memory for storing at least one of the number of charging or injection procedures performed, a disabling device for disabling at least one of the charging procedure or injection procedure of said injection device when a predetermined maximum number of procedures is reached. An optical or acoustic output device outputs the number of charging procedures and/or injection procedures performed. A warning signal is outputted when a predetermined maximum number of charging/injection procedures is reached and once a predetermined period of time has elapsed.

U.S. Pat. No. 6,253,570, issued to Lustig, teaches a traveling bag for carrying temperature-sensitive medications such as insulin which includes a sensor monitoring the interior temperature and an exterior display showing the measured temperature. In one embodiment, the bag interior includes a compartment for storing medication, an assembly for securely holding three insulin pens, and a compartment for holding a container of freezing material. A second embodiment of the bag omits the freezing material compartment.

U.S. Pat. No. 5,400,610, issued to Macedo, teaches a portable insulated container with temperature indicator and which includes a plurality of panels which define a formed body having a mouth opening opposite the bottom of the body. A cover member selectively opens and closes the mouth opening. A temperature indicating assembly includes a visually perceptible indicator in direct communication with a heat source/cold source disposed within the container, and which is also provided to allow an individual to determine the relative temperature of the contents of the container without the necessity for opening the cover member.

U.S. Pat. No. 5,865,314, issued to Jacober, teaches an injectable medication carrying case including a top panel, an opposite bottom panel, two opposing side panels, two opposing end panels, and a thermally-insulating divider panel. The top panel, bottom panel, side panels and end panels can be joined together in standard fashion at respective edges of the carrying case. The divider panel partitions the body portion of the case into two distinct and thermally-insulated sides. In this arrangement, the patient is able to selectively store his injectable medication supplies in a unitary carrying case, as opposed to a plurality of carrying cases.

Finally, U.S. Pat. No. 7,041,941, issued to Faries, Jr. et al., teaches a medical item thermal treatment system and method of monitoring medical items for compliance with prescribed requirements. A monitoring or data recording device includes indicators for determining compliance of the medical solution with prescribed requirements (e.g., manufacturer, medical standards or regulations, and the like). The medical item may further include a bar code or transponder to uniquely identify the medical item to a thermal treatment system measuring and storing conditions in a central database. Additional features include thermal treatment systems that monitor medical items for prescribed requirements and display the monitored parameters to medical personnel. In addition, the present invention includes placing time stamp information on medical items to enable determination by medical personnel of compliance with prescribed requirements.

SUMMARY OF THE PRESENT INVENTION

The present invention discloses a temperature monitoring system for use with such as insulin and other types of medications (injectable or otherwise) and which are particularly temperature sensitive. As will be subsequently described, the inventions contemplate a medication monitoring container device, capable of being used either separately (e.g., such as within a conventional refrigerator) or incorporated into a portable refrigerated appliance for storing and transporting the desired medications.

The cooling device has a body of specified shape defining an interior volume for holding the medications. A power source includes at least one of a battery, 12 volt DC and an attachable 110 volt AC supply and operates processor circuitry including such as a preset or variable temperature control. Additional power sources contemplate use of other battery types, 12 volt DC car charger or 110 AC input. An internal thermostat is in operative communication with the circuitry to provide the desired temperature control of the interior volume.

A portable monitoring device is integrated in a selected variant into the cooling device and further incorporates additional processor driven circuitry for recording a temperature of the cooler's interior volume containing the medications, as well as for comparing the recorded temperature at determined intervals to a preset programmed temperature range. Upon exceeding the programmed range or a specified amount of time at temperature, the monitoring or cooling device issues an alert, depending upon the particular circuitry arrangement employed and whether the monitor is configured to control all processor functions associated with the portable cooling device or, alternatively, to operate as a standalone device, such as in a conventional refrigerated environment, and in order to maintain the temperature profile of a reduced volume of medications contained within a portable enclosure built into the monitor. As previously suggested, usage as a standalone device contemplates the portable monitoring device's circuitry potentially being powered by means of a battery supply (such as a 9 volt battery). A separable monitor may also include a dedicated power source.

An alternative monitoring device is further envisioned to ship with the medication from the manufacturer and to remain with the medication container until the medications are used up. In this instance and in the event a designated temperature range is exceeded or the medication is subjected to a certain temperature for a defined period of time, the chemical, mechanical, or electronic based device provides a good/bad quality indication for the user. A further derivative of this concept would incorporate a gauge based device similar to a stopwatch or small pager. In addition to employing a yes/no indicator, the battery based device would provide required temperature monitoring parameters (e.g., range, current temperature, etc.) and again may also reside with the medication during shipment and subsequent storage.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
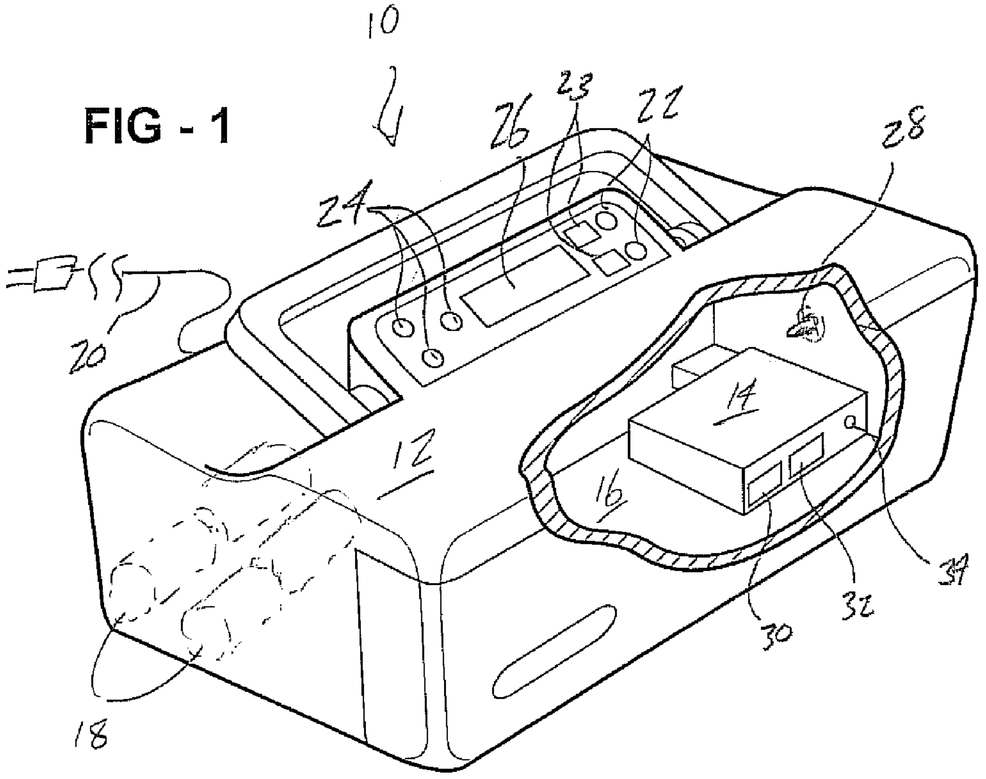
FIG. 1 is a perspective illustration, in partial cutaway, of the medical injectable monitoring system according to the present inventions including the portable cooling device and built-in monitor.

Referring now to FIG. 1, a perspective illustration is shown at 10, in partial cutaway, of a medical injectable monitoring system according to one possible embodiment of the present inventions and which includes a portable cooling device 12 and built-in monitor 14. As previously described, the present invention discloses a temperature monitoring system for use with such as insulin and other types of medications (injectable or otherwise) and which are particularly temperature sensitive. The inventions, as will be further described, contemplate the medication monitoring container device 14 capable of being used either separately (e.g., such as within a conventional refrigerator) or incorporated (fixed or releasably secured) into the portable refrigerated appliance 12 for storing and transporting the desired medications.

The cooling device 12 has a body of specified shape defining a handle and an interior volume 16 for holding a volume of the medications (not shown but understood to include by example such biological medications including insulin and as well as Enbrel, Humira, etc., with indications for rheumatoid arthritis, psoriatic arthritis, other types of fertility drugs, as well as any other type of medication typically administered through injection). While the preferred embodiments further disclose the preferable practice of refrigeration of medications, the present invention also contemplates a situation where a medication of some type may require an opposite and thermal (heat) maintained profile, and for which the present invention can be likewise configured.

The cooling device includes a power source include at least one (and typically both) of a 12 volt DC (see representative batteries in phantom illustration at 18) and/or an attachable 110 volt AC supply cord 20. The selected power source operates a processor circuitry incorporated into the body of the cooling device 12 and which includes such as a preset or variable temperature control, see control buttons 22 (with corresponding readout displays 23) as well as control 24 and additional LCD (or LED) readout display 26.

An internal thermostat is in operative communication with the circuitry to provide the desired temperature control of the interior volume 16 and may either be built into the monitor 14 (as will be subsequently described) or provided as a separate thermostat 28, such as secured along an inner facing wall of the cooling device interior.

Figure 2:
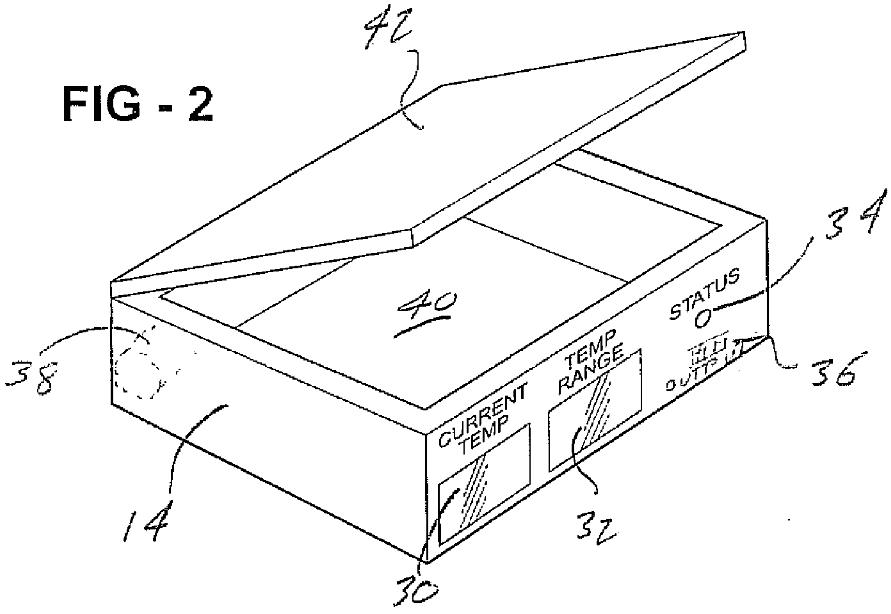
FIG. 2 is an illustration of the monitor forming a portion of the present inventions and which is understood to be capable of being utilized either in combination with the cooling device or separately.

The portable monitoring device 14 is, as disclosed in the embodiment of FIG. 1, integrated into the cooling device 12 interior. As further illustrated in the illustration of FIG. 2, the monitor 14 in one nonlimiting variant exhibits handheld dimensions (e.g., such as 4"×4"×1.5" or so) and incorporates additional processor driven circuitry, not illustrated but represented by current temperature display 30, temperature range 32, status 34 (e.g., green for good and red for bad) and an optional audible output display 36.

In this fashion, the monitor 14 operates in one selected variant for recording a temperature of the cooler's interior volume 16 containing the medications (and displayed at 30), as well as for comparing the recorded temperature at determined intervals to a preset programmed temperature range, again shown at 32. Upon exceeding the programmed range, the monitoring or cooling device issues an alert, this again being either a red/bad visual (typically LED) illustration at 34 and/or an output, at 36, and which can either be communicated to the circuitry associated with the cooling device 12 or separately issued by such as a micro controller and speaker built into the monitor 14, and again depending upon the particular circuitry arrangement employed and whether the monitor 14 is configured to control all processor functions associated with the portable cooling device 12 or, alternatively, to operate as a standalone device, such as in a conventional refrigerated environment. Besides monitoring in a conventional refrigerator, the monitor could be used during shipment of medication to the patient.

In the further variant referenced above, the monitor 14 may include a portable battery supply (see referenced at 38 in FIG. 2), and in order to maintain the temperature profile of a reduced volume of medications contained within a portable enclosure 40 built into the monitor interior 14 and accessible through a lid 42. As described previously, the monitor may have a battery built into the monitor housing, and such as further including a visually evident life indicator. As previously stated, the present inventions contemplate the monitor 14 operating as either an integrating component of a portable cooler 12 or, alternatively, as a standalone item in use within a conventional refrigerated environment.

Figure 3:
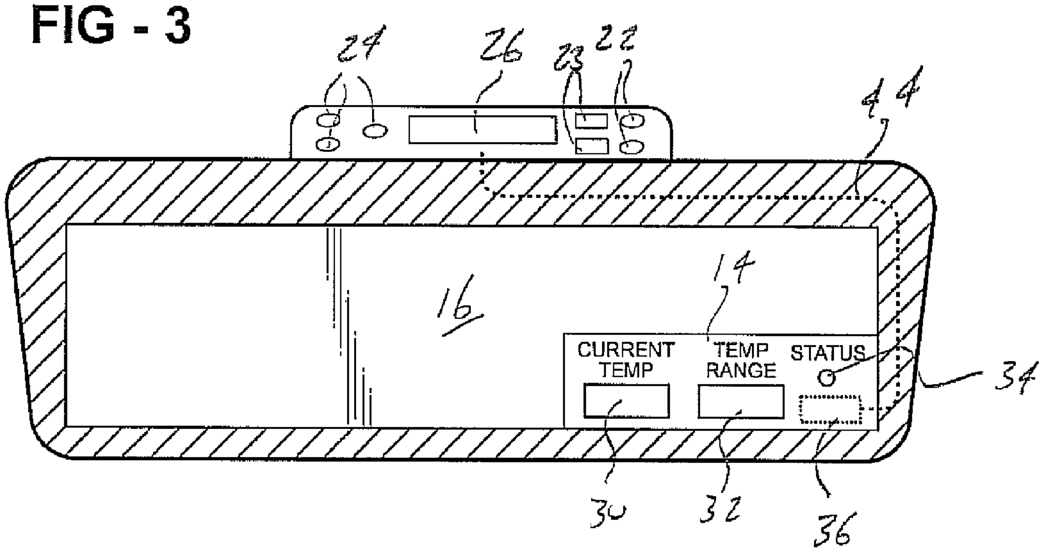
FIG. 3 is a front cutaway view of the cooling device illustrated in FIG. 1 and showing the interfacing aspects of the monitor circuitry with that associated with the cooler.

FIG. 3 further illustrates a front cutaway view of the cooling device illustrated in FIG. 1 and showing the interfacing aspects of the monitor 14 circuitry with that associated with the cooler 12 (see communication line 44 in phantom within the portable cooling device 12 and extending between the interfacing location 36 of the built in monitor 14 and the remote display components references at 22, 23, 24 and 26). The monitoring device 14 in this embodiment is incorporated (either permanently or removably) from within the device interior 12.

Figure 6:
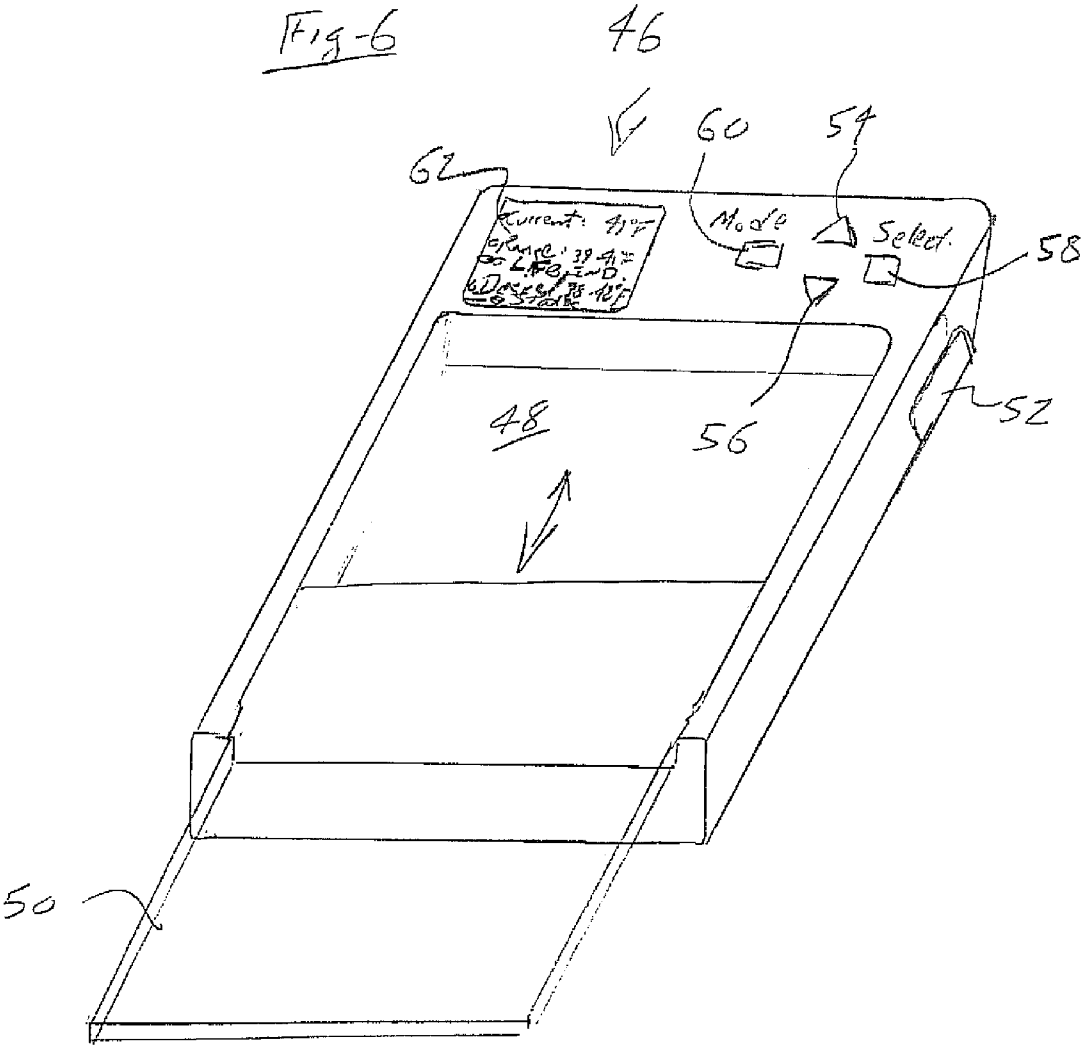
FIG. 6 is an illustration of an alternately configured monitoring device according to a further preferred variant of the present invention.

Referencing FIG. 6, a modified variant of the monitoring device is illustrated at 46 and which can operate as a standalone device (such as within a separate refrigerated environment) as previously described. The features of the monitoring device 46 include a three-dimensional and handheld sized body (in one nonlimiting variant exhibiting a rectangular three-dimensional shape with internal cavity dimensions of 6"×6"×1.75" and exterior dimensions on the order of 6.5"×8"×2.5").

The internal cavity 48 is revealed such as by a sliding lid portion 50 and a power supply is provided by such as a battery inserted through door 52. The internal processing capabilities of the device 46 are accessed through such as up/down buttons 54 and 56, select button 58 and mode button 60. A readout display is referenced at 62 and presents information such as current temperature, temperature range (actual), desired range and status (good/bad) as well as a battery life indicator.

Figure 4:
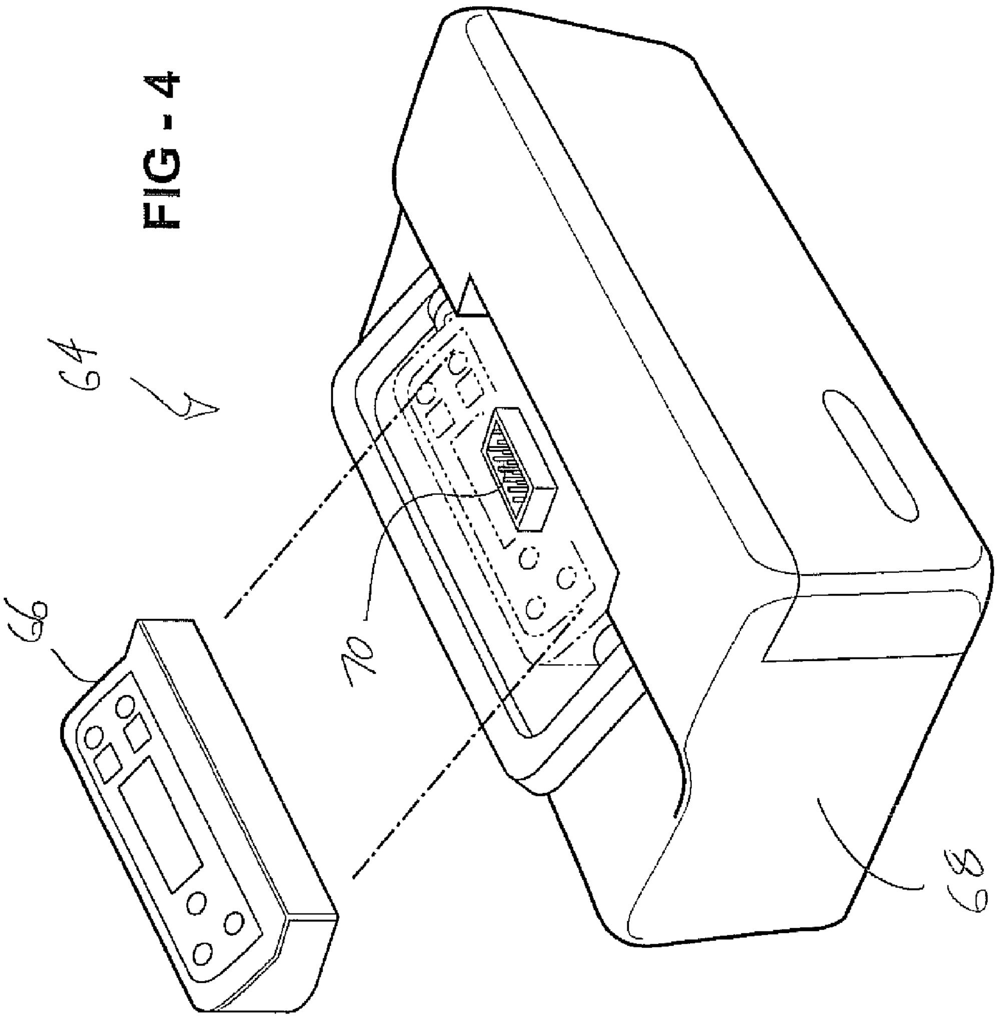
FIG. 4 is an illustration in exploded fashion of a monitoring system according to a further possible variant and showing a modified configuration of cooling device and monitor, and by which the monitor is releasably interfaceable/engageable to an exterior location of the cooler.

Referring to FIG. 4, a further illustration is illustrated in exploded fashion at 64 of a monitoring system 66 according to a further possible variant and showing a modified configuration of cooling device 68, and by which the monitor is releasably interfaceable/engageable to an exterior location of the cooler 68. In particular, a docking port is incorporated into the cooling device 68 to which the monitor 66 and associated circuitry is operatively connected and further includes a plurality of pin connectors 70 disposed upon an exterior surface of the cooling device 68 and to which additional connectors associated with an exterior underside of the monitor 66 (not shown in FIG. 4 but generally referenced at 72 in FIG. 5) are operatively engaged.

As previously discussed, the monitor further may incorporate additional circuitry for dictating parameters associated with the cooling device, these including at least one of an interior temperature and operation cycle. The additional functional and operating characteristics of the cooling device and associated monitor are consistent with that previously described and such that a repetitive description is not required herein.

Figure 5:
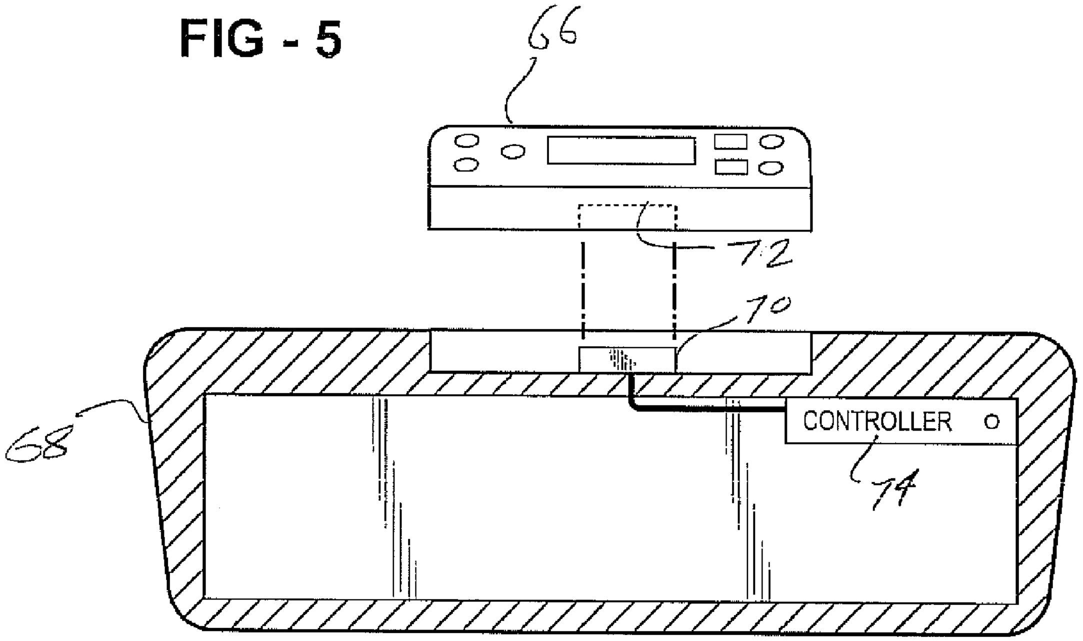
FIG. 5 is a front cutaway view of the cooling device illustrated in FIG. 4 and again showing the interfacing aspects of monitor circuitry with that associated with the cooler.

Referring further to the front cutaway view of the cooling device 68 illustrated in FIG. 5, additional interfacing aspects of monitor circuitry with that associated with the cooler are referenced by controller designation 74. The understanding is that the monitor 66 is again capable of providing all of the processor (brains) applications for the cooling device 68, or alternately interfacing with additional processor capability built into the cooling device.

The present inventions provide a storage monitoring and cooling system which ensures that medications are properly stored for safe and effective use. The system is further designed to monitor the storage and maintenance of the medication's required storage temperatures, as well as being programmable for establishing a desired temperature range, monitoring and recording storage temperatures, and providing an alert if the medications' temperature does not remain within a preset temperature for a predetermined period of time. Programmability further takes into account the ability to input and store different medication parameters.

As such, the present invention is ideal for use by a patient/user (either traveling or at home) and who must maintain their medications in a continuously cooled state. The present invention is particularly useful in situations such as during a power outage and in order to provide an effective backup cooling and monitoring system. These supports further maintain patient safety by reducing the likelihood of spoiled medication being administered. As also previously discussed, an alternative monitoring device is envisioned to ship with the medication from the manufacturer and remain with the medication container until the medications are used. If during transport or subsequent storage a temperature range is exceeded or the medication is at a certain temperature for a defined period of time, the chemical, mechanical, or electronic based device provides a good/bad product quality indication for the user. A derivative of this concept would be a gauge based device similar to a stopwatch or small pager. In addition to having a yes/no indicator, the battery based device would provide the required temperature monitoring parameters (e.g., range, current temperature). It would also reside with the medication during shipment and subsequent storage.

Having now described my invention, other and additional preferred embodiments will become apparent to those skilled in the art to which it pertains, and without deviating from the scope of the appended claims.

I claim:

1. A combination portable cooling device and interiorly positionable monitor retaining temperature-sensitive medications, said combination comprising:

said cooling device having a body of specified shape with an accessible location defining an interior volume, a power source communicating with said cooling device and including at least one of a 12 volt DC and an attachable 110 volt AC supply;

a processor driven circuitry incorporated into said cooling device and in operative communication with said power source, as well as an internal thermostat for recording a temperature of said interior volume, said circuitry comparing the recorded temperature at determined intervals to a preset programmed temperature range;

at least one control button and associated readout display configured upon an exterior of said cooling device and communicating with said processor driven circuitry for programming a desired temperature and monitoring the sensed temperature within said interior volume;

said monitor further comprising a lid which is actuated to reveal an enclosure for holding the medications, additional processor driven circuitry incorporated into said monitor which is separate from said cooling device and which includes at least a current temperature display, temperature range and medication good/bad status indicator; and said monitor being utilized both within and separately from said interior volume of said cooling device and so that, upon the temperature within said volume exceeding said programmed range, said device issuing an alert.

2. The device as described in claim 1, said monitor further comprising an audible output in response to a determined variance between the recorded temperature and preset temperature range for said predetermined period of time.

3. The device as described in claim 1, said processor driven circuitry further comprising a binary indication of whether the recorded temperature varies from the preset temperature range for a predetermined period of time.

4. The device as described in claim 3, said monitor having a specified shape and size and further comprising a digital keypad and a readout display.

5. The device as described in claim 4, further comprising a mode key for adjusting said display and for establishing operating parameters of said monitor including at least one of setup, time, date, temperature range and output display.

6. A system for monitoring temperature-sensitive medications comprising, in combination:

a cooling device having a body of specified shape, a power source communicating with said cooling device and including at least one of a 12 volt DC and an attachable 110 volt AC supply;

a portable monitor including a lid which is actuated to reveal an enclosure for holding the medications, said monitor interfacing said cooling device in a selected configuration and such that said cooling device controls the internal temperature within said monitor;

a processor driven circuitry incorporated into each of said cooling device and said monitor for recording a temperature of said medications within said monitor and for comparing the recorded temperature at determined intervals to a preset programmed temperature range; and at least one control button and associated readout display configured upon an exterior of said monitor and communicating with said processor driven circuitry for programming a desired temperature and monitoring the sensed temperature within said monitor.

7. The system as described in claim 6, said processor driven circuitry further comprising a binary indication of whether the recorded temperature varies from the present temperature range for a predetermined period of time.

8. The system as described in claim 6, further comprising a docking port incorporated into said cooling device and to which said monitor and associated circuitry is operatively connected.

9. The system as described in claim 8, said docking port further comprising a plurality of pin connectors disposed upon an exterior surface of said cooling device and to which additional connectors associated with an exterior of said monitor are operatively engaged.

* * * * *